US009820220B2

(12) United States Patent
Gao et al.

(10) Patent No.: US 9,820,220 B2
(45) Date of Patent: Nov. 14, 2017

(54) TRANSFER METHOD AND DONOR ENODEB FOR SUBFRAME CONFIGURATION INFORMATION OF SERVING CELL

(71) Applicant: Xi'an Zhongxing New Software Co., Ltd., Xi'an, Shaanxi (CN)

(72) Inventors: Yin Gao, Shenzhen (CN); Feng Xie, Shenzhen (CN)

(73) Assignee: Xi'an Zhongxing New Software Co., Ltd., Shaanxi (CN)

( * ) Notice: Subject to any disclaimer, the term of this patent is extended or adjusted under 35 U.S.C. 154(b) by 215 days.

(21) Appl. No.: 14/439,072

(22) PCT Filed: Aug. 15, 2013

(86) PCT No.: PCT/CN2013/081525
§ 371 (c)(1),
(2) Date: Apr. 28, 2015

(87) PCT Pub. No.: WO2014/067317
PCT Pub. Date: May 8, 2014

(65) Prior Publication Data
US 2015/0289202 A1 Oct. 8, 2015

(30) Foreign Application Priority Data
Nov. 1, 2012 (CN) .......................... 2012 1 0429652

(51) Int. Cl.
*H04W 4/00* (2009.01)
*H04W 48/20* (2009.01)
*H04L 5/14* (2006.01)
(Continued)

(52) U.S. Cl.
CPC ............... *H04W 48/20* (2013.01); *H04L 5/14* (2013.01); *H04W 72/0446* (2013.01);
(Continued)

(58) Field of Classification Search
None
See application file for complete search history.

(56) References Cited

U.S. PATENT DOCUMENTS

2012/0003962 A1 1/2012 Jeon et al.
2012/0315913 A1 12/2012 Yang et al.

FOREIGN PATENT DOCUMENTS

CN 102076041 A 5/2011
CN 102088740 A 6/2011
(Continued)

OTHER PUBLICATIONS

International Search Report of PCT/CN2013/081525 dated Nov. 21, 2013.
R3-101891, 3GPP TSG RAN WG3 Meeting AH, Beijing, P.R. China, Jun. 29-Jul. 1, 2010, Agenda Item 7.3, Ericsson, X2 Proxy Functionality for Relays, Discussion and Decision, 5 pages.
Office Action dated Mar. 1, 2016 of Japanese Application No. JP2015-540024.
Supplemental European Search Report of EP13851870, dated May 10, 2016.

*Primary Examiner* — Zewdu A Beyen
(74) *Attorney, Agent, or Firm* — Banner & Witcoff, Ltd.

(57) ABSTRACT

A transfer method for subframe configuration information of a serving cell and a donor eNodeB are applied in a mobile relay scene. The method comprises: a current donor eNodeB sending a cell activation message to a target donor eNodeB, wherein the cell activation message comprises Long Term Evolution Time Division Duplex (LTE-TDD) subframe configuration information of a serving cell of a mobile relay (MR) under the current donor eNodeB. The above-mentioned technical solution solves the problem how to ensure the continuity of the TDD subframe configuration in the cell of the target DeNB currently when the MR moves among several donor eNodeBs.

12 Claims, 2 Drawing Sheets

(51) Int. Cl.
*H04W 72/04* (2009.01)
*H04W 84/04* (2009.01)
*H04W 92/20* (2009.01)
*H04W 88/12* (2009.01)
*H04W 84/00* (2009.01)
*H04W 24/02* (2009.01)

(52) U.S. Cl.
CPC .......... *H04W 24/02* (2013.01); *H04W 84/005* (2013.01); *H04W 84/047* (2013.01); *H04W 88/12* (2013.01); *H04W 92/20* (2013.01)

(56) References Cited

FOREIGN PATENT DOCUMENTS

| | | |
|---|---|---|
| CN | 102149195 A | 8/2011 |
| EP | 2424280 A1 | 2/2012 |
| EP | 2611245 A1 | 7/2013 |
| EP | 2696517 A2 | 2/2014 |
| JP | 2011091785 A | 5/2011 |
| WO | 2011011761 A2 | 1/2011 |
| WO | 2011137791 A1 | 11/2011 |
| WO | 2012138157 A2 | 10/2012 |

TRANSFER METHOD AND DONOR ENODEB FOR SUBFRAME CONFIGURATION INFORMATION OF SERVING CELL

TECHNICAL FIELD

The present document refers to the wireless cellular communication system, and in particular, to a transfer method for subframe configuration information of a serving cell and a donor eNodeB.

BACKGROUND

In order to keep the competitiveness of the third generation mobile communication system in the communication field, the 3rd Generation Partnership Project (3GPP) standard work group is devoted to the research of the Evolved Packet System (EPS). The whole EPS system mainly includes two parts, the Evolved Universal Terrestrial Radio Access Network (E-UTRAN) and the Evolved Packet Core (EPC). The EPC of that system can support the user's accessing from the global mobile communication system (GSM)/enhanced data rate GSM service (EDGE) radio access network (GERAN) and the Universal Terrestrial Radio Access Network (UTRAN).

The EPC packet core network includes the Home Subscriber Server (HSS), the Mobility Management Entity (MME), the Serving Gateway (S-GW), the packet data network (PDN) gateway (P-GW), the Serving GPRS Support Node (SGSN) and the Policy and Charging Enforcement Function (PCRF), wherein:

the HSS is the permanent storage place of the subscription data of the users, located in the home network where the users sign the contract;

the MME is the storage place of the subscription data of the users in the current network, responsible for the management of signaling from the terminal to the network Non-Access Stratum (NAS), the tracing and paging management function of the user in the idle mode, and the bearing management;

the S-GW is the gateway from the core network to the wireless system, responsible for the user plane bearing from the terminal to the core network, the data buffer of the terminal under the idle mode, the function of initiating the service request by the network side, the legal eavesdropping, and the packet data routing and forwarding function;

the P-GW is a gateway of an evolved packet domain system (EPS) and an outside network of that system, responsible for the functions, such as, the terminal IP address allocation, the charging function, the packet filtering, the policy application, etc.;

the SGSN is a service support point of accessing the EPC network by the GERAN and UTRAN users, similar to the MME functionally, responsible for the functions, such as, the update of the user location, the paging management and the bearing management, etc.; and the PCRF is responsible for providing the policy control and charging for the PCEF.

Under some scenes, in order to expand the wireless coverage range, or increase the ability of wirelessly providing the access users temporarily, the concept of the Relay Node is introduced. The schematic diagram of the network framework is shown in FIG. 1, and the network element is explained as follows.

The Relay Node (RN) includes two parts of functions, the UE and the relay node. The RN, on one hand, acts as the UE to access the network, performing related operations such as establishing the bear, and on the other hand, as the eNB to provide access for the UE.

The donor eNodeB (Donor eNodeB, DeNB) provides the wireless access for the RN, terminates the wireless resource control (RRC) signaling of the RN-UE, and terminates the S1AP signaling and the X2 signaling of the RN-eNB. And also it is built in with the SGW and the PGW of the RN-UE at the same time.

The Relay Node Operator and Management (RN OAM) is used for the RN to obtain essential connection information therefrom.

The main purpose for the operator to deploy the framework is to expand the coverage range of the eNodeB through deploying the relay node at some places where it is inconvenient to deploy the wired connection, such as, relatively remote under-developed area, or sudden large-scale meeting or match. And under this kind of scene, the position of the relay node is generally fixed. However, with the application of the relay node, the operator begins to consider applying this technology to more extensive scene, for example, on the high-speed railway. Because the train is moving at a high speed, a large number of wired commercial facilities are required to deploy along the line of the train, this has increased the deployment cost of the operator greatly; while the wireless link between the relay node and the donor eNodeB can just reduce the cost, therefore, it is favored by the operator, and this kind of device is called the mobile relay (MR), which can be referred to FIG. 2.

Because the current DeNB serving cell can be the long term evolution frequency division duplex (LTE-FDD) cell and also can be the long term evolution time division duplex (LTE-TDD) cell. In the LTE-TDD system, because it adopts the time division duplex mechanism, the proportion of the uplink and downlink subframes can be configured in a flexible way. There are 10 subframes existed in the frame structure of the LTE-TDD system, and the subframe is divided into two types, the regular subframe and the special subframe; the regular subframe is formed by two time slots with length of 0.5 ms, and the special subframe is formed by three special time slots, which are respectively the downlink pilot frequency time slot, the uplink pilot frequency time slot and the guard space, and the sum of the lengths of these three special time slots is 1 ms. The LTE-TDD system has 9 kinds of different special subframe configuration modes. The LTE-TDD subframe configuration information carried in the serving cell currently is shown in Table 1. When the MR moves over into the next DeNB, the target DeNB cell needs to set the TDD configuration (TDD-config) according to the proportion of the uplink and downlink flowrates (traffics) of the MR, or continuously uses the TDD subframe configuration of the current serving DeNB cell. Especially, the current LTE-TDD cell can dynamically adjust the TDD subframe configuration according to the service condition of the current cell, that is, the TDD subframe configuration of the next DeNB serving cell, to which the current DeNB serving cell and the MR move over, is preferably able to keep the continuity. However, it is a problem to be solved how the target DeNB cell guarantees to be able to perform the TDD subframe configuration effectively and fast when the mobile relay node moves among multiple donor eNodeBs at present.

TABLE 1

| LTE-TDD subframe configuration information | |
| --- | --- |
| Regular subframe configuration | ENUMERATED (sa0, sa1, sa2, sa3, sa4, sa5, sa6, . . . ) |
| Special subframe configuration | |
| >Special subframe mode | ENUMERATED(ssp0, ssp1, ssp2, ssp3, ssp4, ssp5, ssp6, ssp7, ssp8, . . . ) |
| >Downlink cycle prefix | ENUMERATED(Normal, Extended, . . . ) |
| >Uplink cycle prefix | ENUMERATED(Normal, Extended, . . . ) |

SUMMARY

The embodiment of the present document provides a transfer method for subframe configuration information of a serving cell, to solve the problem how the target DeNB cell guarantees the continuity of the TDD subframe configuration when the MR moves among multiple donor eNodeBs at present.

In order to solve the above-mentioned technical problem, the following technical solution is adopted.

A transfer method for subframe configuration information of a serving cell, applied in the mobile relay scene, comprises:

a current donor eNodeB sending a cell activation message to a target donor eNodeB, wherein the cell activation message comprises Long Term Evolution Time Division Duplex (LTE-TDD) subframe configuration information of a serving cell of a mobile relay (MR) in the current donor eNodeB.

Alternatively, the step of the current donor eNodeB sending the cell activation message to the target donor eNodeB comprises:

the current donor eNodeB sending the cell activation message to the target donor eNodeB through an X2 interface or an S1 interface.

Alternatively, the step of the current donor eNodeB sending the cell activation message to the target donor eNodeB through the S1 interface comprises:

the current donor eNodeB sending the cell activation message to a mobile management entity (MME) through the S1 interface, and the MME sending the cell activation message to the target donor eNodeB through the S1 interface.

Alternatively, the cell activation message further comprises information of one or more cells to be activated.

Alternatively, before the current donor eNodeB sends the cell activation message to the target donor eNodeB, the method further comprises:

the current donor eNodeB determining the target donor eNodeB according to historical cell information carried in a switchover request message of the MR.

A donor eNodeB, applied in a mobile relay scene, comprises a sending module, wherein:

the sending module is configured to: send a cell activation message to a target donor eNodeB, wherein the cell activation message comprises Long Term Evolution Time Division Duplex (LTE-TDD) subframe configuration information of a serving cell of a mobile relay (MR) in the current donor eNodeB.

Alternatively, the sending module is configured to send the cell activation message to the target donor eNodeB according to the following mode:

sending the cell activation message to the target donor eNodeB through an X2 interface or an S1 interface.

Alternatively, the sending module is configured to send the cell activation message to the target donor eNodeB through the S1 interface according to the following mode:

sending the cell activation message to a mobile management entity (MME) through the S1 interface, so that the MME sending the cell activation message to the target donor eNodeB through the S1 interface.

Alternatively, the cell activation message further comprises information of one or more cells to be activated.

Alternatively, the determination module is configured to: determine the target donor eNodeB according to historical cell information carried in a switchover request message of the MR.

The above-mentioned technical solution, through carrying the LTE-TDD subframe configuration information in the interface message, enables the target DeNB be able to select and configure the LTE-TDD subframe effectively and fast after the mobile relay moves over to the target DeNB, which fully considers the service volume of the MR and enables the TDD subframe configuration of the serving cell of the MR keep the continuity and helps to realize the mobile relay switchover optimization and improve the network performance.

PREFERRED EMBODIMENTS OF THE PRESENT DOCUMENT

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other.

The embodiment of the present document provides a transfer method for subframe configuration information of a serving cell, the method performs the description from the current donor eNodeB and is applied in the mobile relay scene, and the method includes the following steps.

In step 101, the current donor eNodeB determines the target donor eNodeB according to historical cell information carried in a switchover request message of the MR.

The step is an alternative step.

In step 102, a current donor eNodeB sends a cell activation message to a target donor eNodeB, wherein the cell activation message includes Long Term Evolution Time Division Duplex (LTE-TDD) subframe configuration information of a serving cell of a mobile relay (MR) in the current donor eNodeB.

The cell activation message further includes information of one or more cells to be activated. And the current donor eNodeB sends the cell activation message to the target donor eNodeB through an X2 interface or an S1 interface.

The transfer method for the subframe configuration information of the serving cell is described in detail from the angle of the interaction between the current donor eNodeB and the target donor eNodeB.

Figure 1:
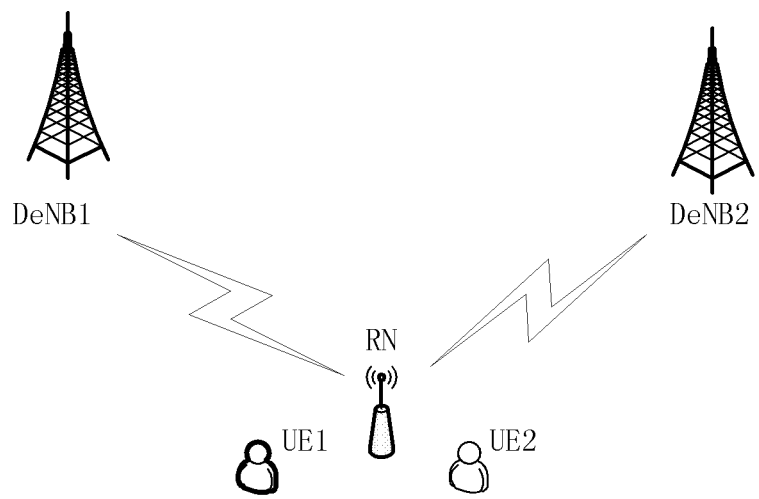
FIG. 1 is deployment scene diagram one of a relevant mobile relay.
Figure 2:
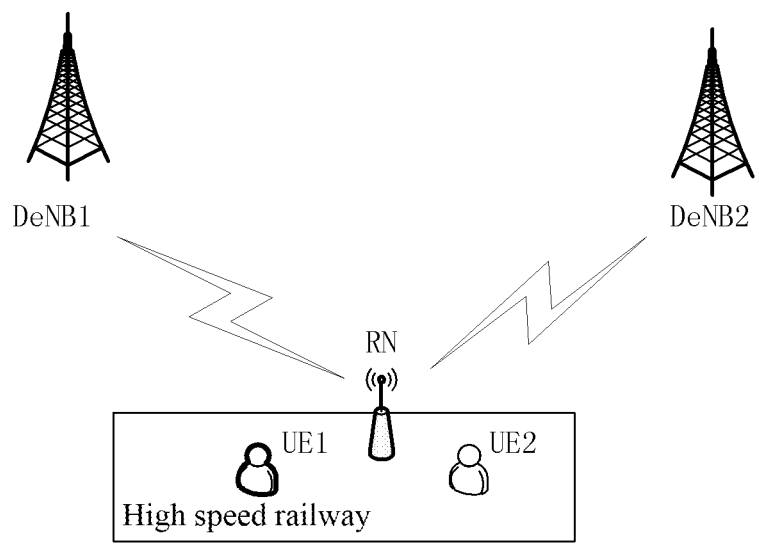
FIG. 2 is deployment scene diagram two of a relevant mobile relay.
Figure 3:
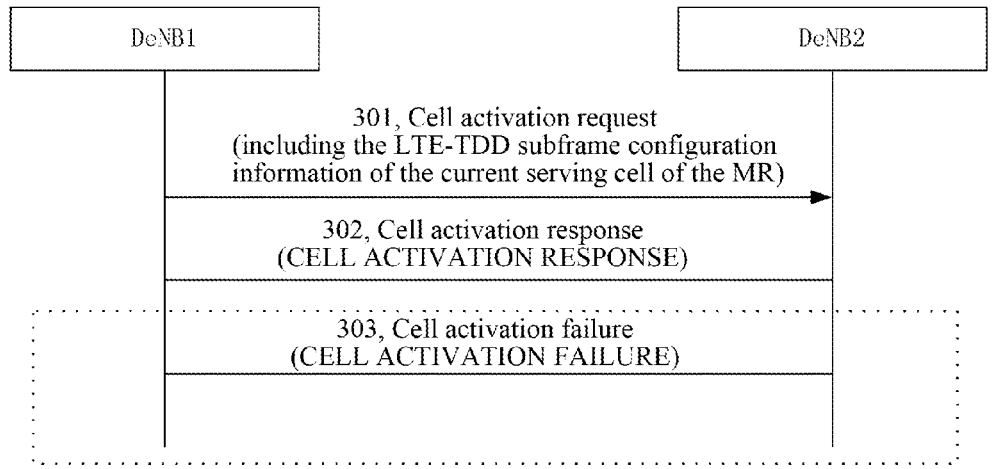
FIG. 3 is a signaling flow chart of transfer method embodiment one for subframe configuration information of the present document.

Combining with FIG. 3, the description of the transfer method embodiment one for the subframe configuration information is as follows.

When the energy conservation judgment is performed locally in the DeNB, the MR user in the current cell moves away and other normal users can be switched to other cells, for example, the DeNB is under the coverage of other macro cells, then it could enter the dormant state.

Because the MR movement has accurate directivity, this point is different from the normal user. Because the switchover procedure of the current MR is the same as that of the normal user, the historical cell information will be carried in the switchover request message. the DeNB1 can determine the movement direction of the MR according to the UE historical information of the MR, and perform the operation of activating the DeNB2 before the MR switches over. Supposing that there is an X2 interface between the DeNB1 and the DeNB2, the method includes the following steps.

In step 301, the DeNB1 sends the cell activation message to the DeNB2 through the X2 interface, where the message includes the information of one or more cells to be activated, and the LTE-TDD subframe configuration information of the serving cell of the MR under the current DeNB1.

In step 302, after the DeNB2 receives the cell activation message, if it is processed successfully, the cell activation confirmation message is sent to the DeNB1; otherwise, step 303 is turned into.

In step 303, the DeNB2 sends the cell activation failure message carrying the failure reason therein to the DeNB1.

Figure 4:
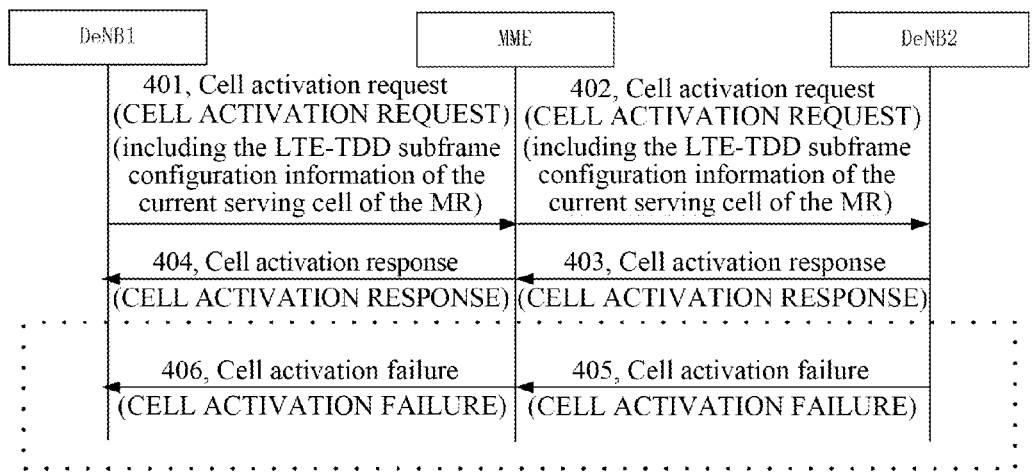
FIG. 4 is a signaling flow chart of transfer method embodiment two for subframe configuration information of the present document.

Combining with FIG. 4, the description of the transfer method embodiment two for the subframe configuration information is as follows.

When the energy conservation judgment is performed locally in the DeNB, if the MR user in the current cell moves away and other normal users can be switched to other cells, for example, the DeNB is under the coverage of other macro cells, then the DeNB could enter the dormant state.

Because the MR movement has accurate directivity, this point is different from the normal user. Because the switchover procedure of the current MR is the same as that of the normal user, the historical cell information will be carried in the switchover request message. The DeNB1 can determine the movement direction of the MR according to the UE historical information of the MR, and perform the operation of activating the DeNB2 before the MR switches over. Supposing that there is no longer an X2 interface between the DeNB1 and the DeNB2, the method includes the following steps.

In step 401, the DeNB1 sends the cell activation message to the DeNB2 through the S1 interface, where the message includes the information of one or more cells to be activated, and the LTE-TDD subframe configuration information of the serving cell of the MR currently under the DeNB1.

In step 402, the MME transparently transmits the cell activation message to the DeNB2 through the S1 interface, the message includes the information of one or more cells to be activated, and the LTE-TDD subframe configuration information of the serving cell of the MR under the current DeNB1.

In step 403, after the DeNB2 receives the cell activation message, if it is processed successfully, the cell activation confirmation message is sent to the MME and step 404 is executed; otherwise, step 405 is turned into.

In step 404, the MME transparently transmits the cell activation confirmation message to the DeNB1; it is ended.

In step 405, the DeNB2 sends the cell activation failure message carrying the failure reason therein for DeNB1 to the MME.

In step 406, the MME transparently transmits the cell activation failure message to the DeNB1.

The above-mentioned transfer method of the subframe configuration information, through carrying the LTE-TDD subframe configuration information in the interface message, enables the target DeNB to select and configure the LTE-TDD subframe effectively and fast after the mobile relay moves over to the target DeNB, which fully considers the service volume of the MR and enables the TDD subframe configuration of the serving cell of the MR keep the continuity and helps to realize the mobile relay switchover optimization and improve the network performance and the user satisfaction.

Figure 5:
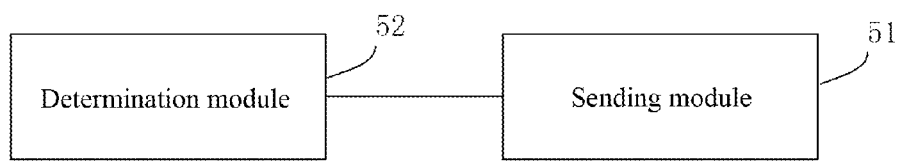
FIG. 5 is a structure diagram of a donor eNodeB according to an embodiment of the present document.

As shown in FIG. 5, it is a structure diagram of the donor eNodeB embodiment of the present document. The donor eNodeB includes a sending module 51, wherein:

the sending module 51 is configured to: send a cell activation message to a target donor eNodeB, wherein the cell activation message includes Long Term Evolution Time Division Duplex (LTE-TDD) subframe configuration information of a serving cell of a mobile relay (MR) in the current donor eNodeB.

Wherein, the sending module 51 is configured to send the cell activation message to the target donor eNodeB according to the following mode: sending the cell activation message to the target donor eNodeB through an X2 interface or an S1 interface. Specifically, the sending module 51 sends the cell activation message to the MME through the S1 interface, so that the MME sends the cell activation message to the target donor eNodeB through the S1 interface.

In addition, the cell activation message further includes information of one or more cells to be activated.

Alternatively, the donor eNodeB further includes a determination module 52, configured to: determine the target donor eNodeB according to historical cell information carried in a switchover request message of the MR before the sending module 51 sends the cell activation message to the target donor eNodeB.

The above-mentioned donor eNodeB, through transferring the LTE-TDD subframe configuration information to the target DeNB, helps the target DeNB to realize the accurate and effective LTE-TDD subframe configuration of the serving cell aiming at the single MR, helps the network performance optimization and improves the user satisfaction.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not to limit, and the present document is described in details only referring to the preferable embodiments. Those skilled in the art should understand that they can make the modifications and equivalents according to the technical scheme of the present document without departing from the spirit and scope of the present document, which should be embodied in the scope of the appending claims of the present document.

INDUSTRIAL APPLICABILITY

The above-mentioned technical solution, through carrying the LTE-TDD subframe configuration information in the interface message, enables the target DeNB to select and configure the LTE-TDD subframe effectively and fast after the mobile relay moves over to the target DeNB, which fully considers the service volume of the MR and enables the TDD subframe configuration of the serving cell of the MR keep the continuity and helps to realize the mobile relay switchover optimization and improve the network performance. Therefore, the present document has very strong industrial applicability.

What we claim is:

1. A transfer method for subframe configuration information of a serving cell, comprising a step of: when a mobile relay (MR) moves among multiple donor eNodeBs, a current donor eNodeB sending a cell activation message to a target donor eNodeB,
   wherein the cell activation message comprises Long Term Evolution Time Division Duplex (LTE-TDD) subframe configuration information of a serving cell of the mobile relay (MR) under the current donor eNodeB,
   wherein, the step of the current donor eNodeB sending the cell activation message to the target donor eNodeB comprises a step of: the current donor eNodeB sending the cell activation message to the target donor eNodeB through an X2 interface or an S1 interface, and
   wherein, the step of the current donor eNodeB sending the cell activation message to the target donor eNodeB through the S1 interface comprises: the current donor eNodeB sending the cell activation message to a mobile management entity (MME) through the S1 interface, and the MME sending the cell activation message to the target donor eNodeB through the S1 interface.

2. The method according to claim 1, wherein, the cell activation message further comprises information of one or more cells to be activated.

3. The method according to claim 2, wherein, before the current donor eNodeB sends the cell activation message to the target donor eNodeB, the method further comprises: the current donor eNodeB determining the target donor eNodeB according to historical cell information carried in a switchover request message of the MR.

4. The method according to claim 1, wherein, before the current donor eNodeB sends the cell activation message to the target donor eNodeB, the method further comprises: the current donor eNodeB determining the target donor eNodeB according to historical cell information carried in a switchover request message of the MR.

5. The method according to claim 1, wherein, before the current donor eNodeB sends the cell activation message to the target donor eNodeB, the method further comprises: the current donor eNodeB determining the target donor eNodeB according to historical cell information carried in a switchover request message of the MR.

6. The method according to claim 1, wherein, before the current donor eNodeB sends the cell activation message to the target donor eNodeB, the method further comprises: the current donor eNodeB determining the target donor eNodeB according to historical cell information carried in a switchover request message of the MR.

7. A donor eNodeB, applied in a mobile relay scene, comprising a sending module, wherein: when the mobile relay moves among multiple donor eNodeBs, the sending module is configured to: send a cell activation message to a target donor eNodeB, wherein the cell activation message comprises Long Term Evolution Time Division Duplex (LTE-TDD) subframe configuration information of a serving cell of a mobile relay (MR) under the current donor eNodeB,
   wherein, the sending module is configured to send the cell activation message to the target donor eNodeB according to the following mode: sending the cell activation message to the target donor eNodeB through an X2 interface or an S1 interface, and
   wherein, the sending module is configured to send the cell activation message to the target donor eNodeB through the S1 interface according to the following mode: sending the cell activation message to a mobile management entity (MME) through the S1 interface, so that the MME sending the cell activation message to the target donor eNodeB through the S1 interface.

8. The donor eNodeB according to claim 7, wherein, the cell activation message further comprises information of one or more cells to be activated.

9. The donor eNodeB according to claim 8, further comprising a determination module, wherein, the determination module is configured to: determine the target donor eNodeB according to historical cell information carried in a switchover request message of the MR.

10. The donor eNodeB according to claim 7, further comprising a determination module, wherein, the determination module is configured to: determine the target donor eNodeB according to historical cell information carried in a switchover request message of the MR.

11. The donor eNodeB according to claim 7, further comprising a determination module, wherein, the determination module is configured to: determine the target donor eNodeB according to historical cell information carried in a switchover request message of the MR.

12. The donor eNodeB according to claim 7, further comprising a determination module, wherein, the determination module is configured to: determine the target donor eNodeB according to historical cell information carried in a switchover request message of the MR.

* * * * *